Patented May 6, 1941

2,241,238

UNITED STATES PATENT OFFICE 2,241,238

SENSITIZING METHINE DYES AND PROCESS FOR PREPARING THEM

Leslie G. S. Brooker and Grafton H. Keyes, Rochester, N. Y., assignors to Eastman Kodak Company, Rochester, N. Y., a corporation of New Jersey No Drawing. Application April 29, 1939, Serial No. 270,916

17 Claims. (Cl. 260—240)

This invention relates to dyes and to a process for preparing them.

A dye of the following formula:

I. 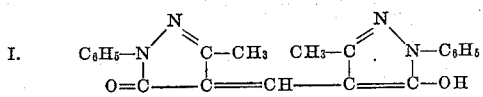

has been prepared by condensing two molecular proportions of 3-methyl-1-phenyl-5-pyrazolone with one molecular proportion of ethylorthoformate. (Claisen,—Annalen der Chemie, vol. 297, page 37, 1897).

We have now found that the above dye and a large number of new dyes can be prepared by condensing an organic compound containing a reactive methylene group adjacent to a carbonyl group, (i. e. an organic compound containing a —CH$_2$—CO— group), with a heterocyclic organic compound of the following general formula:

II. 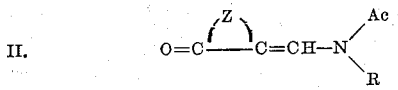

wherein Ac represents an acyl group, R represents an aryl group and Z represents the non-metallic atoms necessary to complete a five-membered or six-membered heterocyclic nucleus.

The dye obtainable by our new process can be called oxonol dyes. By means of our new process, oxonol dyes, unattainable by the aforesaid orthoformic ester method, can be made. Thus, for example, 2-thio-2,4(3,5) - thiazoledienes (rhodanines), 2-thio-2,4(3,5)-oxazolediones and 2 - thio - 2,4(3,5)-imidazolediones (2-thiohydantoins) cannot readily be condensed with esters of orthoformic acid, such as ethylorthoformate, to give oxonol dyes. By our new process, however, such new oxonol dyes can be made. Such new oxonol dyes, unlike the known pyrazolone oxonol dye, sensitized photographic silver halide emulsions strongly and are especially useful for that purpose. Furthermore, unsymmetrical oxonol dyes, such as an oxonol dye containing both a rhodanine and a 2-thiohydantoin or a 5-pyrazolone nucleus, cannot be prepared by the orthoformic ester process, whereas they are obtainable by our new process.

It is, accordingly, an object of our invention to provide a process for preparing dyes. A further object is to provide new dyes. Other objects will become apparent hereinafter.

According to our invention, we condense an organic compound containing a —CH$_2$—CO— group with a heterocyclic organic compound of the following general formula:

II. 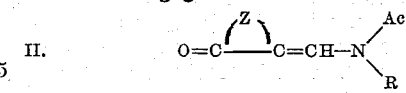

wherein Ac represents an acyl group, such as acetyl, propionyl or benzoyl for example, R represents an aryl group, such as phenyl or naphthyl for example and Z represents the non-metallic atoms necessary to complete a five-membered heterocyclic nucleus, such as a thiazolone nucleus (e. g. a 2,4(3,5)-thiazoledione nucleus, a 2-thio-2,4(3,5)-thiazoledione nucleus, a 2-alkylphenylamino-4(5)-thiazolone nucleus or a 2-diphenylamino-4(5)-thiazolone nucleus), a 3-alkyl-2,4(3,5)-oxazoledione nucleus, a 2-thio-2,4(3,5)-imidazoledione nucleus or a 5-pyrazolone nucleus for example, or Z represents the non-metallic atoms necessary to complete a six-membered heterocyclic nucleus such as a barbituric acid nucleus for example.

According to our new process, the condensations are advantageously effected in the presence of a basic condensing agent. As basic condensing agents, we have found that strong organic bases, i. e. organic bases having a dissociation constant substantially greater than that of pyridine, are advantageously employed. Strong tertiary organic bases, such as trialkylamines and N-alkylpiperidines for example, are advantageously employed. Other basic condensing agents, such as sodium and potassium carbonate for example, can be employed. An excess of the basic condensing agent is advantageously employed. Excesses of from 100 to 300% (i. e. from 2 to 4 molecular proportions of the basic condensing agent for each molecular proportion of heterocyclic compound of Formula II) are advantageously used.

The condensations are advantageously effected in the presence of a diluent. Pyridine is especially useful for this purpose. Methyl, ethyl and propyl alcohols can be used as diluents. Heat accelerates the formation of dyes according to our new process.

Inasmuch as the dyes obtainable by our process are acidic, they are ordinarily obtained in the first instance as salts formed by the interaction of the dyes (as they are formed) with the basic condensing agents. The dyes can be freed from the salt forms by treating the salts with strong acids, i. e. acids having dissociation constants of the order of that of hydrochloric acid. Hydrochloric acid and perchloric acid, particularly the latter, are useful for this purpose.

As organic compounds containing a —CH₂—CO— group which are useful in practicing our invention we include five-membered and six-membered heterocyclic organic compounds, such as thiazolones (e. g. 2,4(3,5)-thiazolediones, 2-thio - 2,4(3,5) - thiazolediones, 2-alkylphenylamino-4(5)-thiazolones and 2-diphenylamino-4(5) - thiazolones), 3-alkyl-2,4(3,5) - oxazolediones, 2-thio-2,4(3,5)-imidazolediones, 5-pyrazolones and barbituric acid for example. We also include carbocyclic organic compounds, such as 1,3-indandione for example. We also include acyclic organic compounds, such as aroylacetonitriles (e. g. benzoylacetonitrile and naphthoylacetonitriles) and N-arylcyanoacetamides (e. g. cyanoacetanilide and N-naphthylcyanoacetamides). The organic compound containing a —CH₂—CO— group is advantageously employed in excess. Excesses of from 100 to 200% (i. e. from 2 to 3 molecular proportions of the compound containing a —CH₂—CO— group for each molecular proportion of heterocyclic compound of Formula II) are advantageously employed.

The following examples will serve to demonstrate the manner of obtaining dyes according to our new process. These examples are not intended to limit our invention.

EXAMPLE 1.—[3-ethylrhodanine-(5)]-[3-phenylrhodanine - (5)] - methinoxonol, triethylamine salt

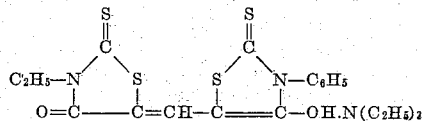

0.9 g. (1 mol.) of 5-acetanilidomethylene-3-phenylrhodanine and 0.8 g. (1 mol.+100% excess) of 3-ethylrhodanine were placed in 10 cc. of pyridine containing 1.0 g. (1 mol.+100% excess) of triethylamine. The resulting mixture was heated at the refluxing temperature for about two hours. The mixture was then cooled and diluted with about 50 cc. of diethyl ether to precipitate the dye-salt. The precipitated dye-salt was filtered off, washed with a little ether and twice recrystallized from methyl alcohol. It was obtained as lustrous green crystals melting at 206 to 209° C. with decomposition.

EXAMPLE 2.—[3-ethylrhodanine-(5)]-[3-phenylrhodanine-(5)]-methinoxonol

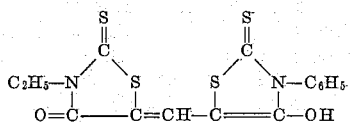

1.8 g. (1 mol.) of 5-acetanilidomethylene-3-phenylrhodanine and 1.4 g. (1 mol.) of 3-ethylrhodanine were placed in 20 cc. of pyridine together with 1.4 g. (1 mol.+300% excess) of potassium carbonate. The resulting mixture was heated at the refluxing temperature for about three hours. The mixture was then cooled and diluted with about 300 cc. of diethyl ether to precipitate the dye-salt. A tarry mass separated. The tarry mass was treated with about 10 cc. of concentrated hydrochloric acid (sp. g. 1.18), whereupon the free dye separated out as a yellow solid. The hydrochloric acid mixture was diluted with an equal volume of water and the free dye was filtered off. The dye was recrystallized from glacial acetic acid.

EXAMPLE 3.—[3-ethylrhodanine-(5)]-[3-phenylrhodanine-(5)]-methinoxonol, N-methylpiperidine salt

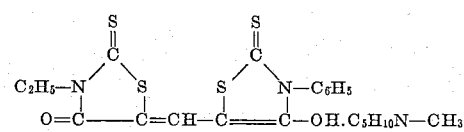

1.8 g. (1 mol.) of 5-acetanilidomethylene-3-phenylrhodanine and 1.4 g. (1 mol.+100% excess) of 3-ethylrhodanine were placed in 20 cc. of pyridine containing 2.0 g. (1 mol.+200% excess) of N-methylpiperidine. The resulting mixture was heated at the refluxing temperatures for about three hours. The mixture was then cooled and diluted with 300 cc. of diethyl ether to precipitate the dye-salt. The dye-salt was filtered off, washed with a small amount of ether and then recrystallized from methyl alcohol. It was obtained as green crystals. It melted at 188° to 190° C. with decomposition.

EXAMPLE 4.—Bis [3-ethylrhodanine-(5)]-methinoxonol, triethylamine salt

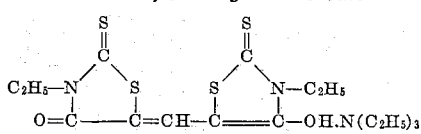

0.75 g. (1 mol.) of 5-acetanilidomethylene-3-ethylrhodanine and 0.8 g. (1 mol.+100% excess) of 3-ethylrhodanine were placed in 10 cc. of pyridine containing 1.0 g. (1 mol.+300% excess) of triethylamine. The resulting mixture was heated at the refluxing temperature for about two hours. The mixture was then cooled and diluted with about 300 cc. of diethyl ether to precipitate the dye-salt. The dye-salt was filtered off, washed with a little ether and then twice recrystallized from methyl alcohol. It was obtained as garnet needles having a blue reflex. It melted at 179° to 182° C. with decomposition.

EXAMPLE 5.—Bis [3-ethylrhodanine-(5)]-methinoxonol

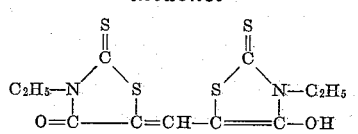

2.15 g. (1 mol.) of bis [3-ethylrhodanine-(5)]-methinoxonol triethylamine salt (prepared as in Example 4) was suspended in 20 cc. of glacial acetic acid. 2 cc. of perchloric acid were then added to the mixture with stirring. The red color of the mixture changed to yellow and the free oxonol dye separated as a brownish solid. It was filtered off, washed with acetic acid and then dried. After two recrystallizations from glacial acetic acid, it was obtained as brownish yellow crystals melting at 130° to 132° C. with decomposition.

EXAMPLE 6.—[3-ethyl-1-phenyl-2-thiohydantoin-(5)]-[3-phenylrhodanine-(5)]-methinoxonol, N-methylpiperidine salt

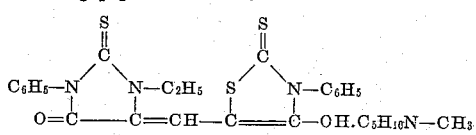

1.8 g. (1 mol.) of 5-acetanilidomethylene-3-phenylrhodanine and 2.2 g. (1 mol.+100% excess) of 3-ethyl-1-phenyl-2-thiohydantoin were placed in 20 cc. of pyridine containing 2.0 g. (1 mol.+300% excess) of N-methylpiperidine. The mixture was then heated at the refluxing temperature for about three hours. The mixture was then cooled and diluted with about 200 cc. of diethyl ether to precipiate the dye-salt. It was filtered off, washed with ether and then twice recrystallized from methyl alcohol. It was obtained as dull red crystals melting at 250° to 252° C. with decomposition.

EXAMPLE 7.—[3-*methyl*-1-*phenyl*-5-*pyrazolone*-(4)]-[3-*phenylrhodanine*-(5)]-*methinoxonol, triethylamine salt*

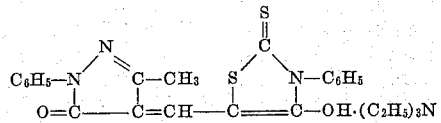

0.9 g. (1 mol.) of 5-acetanilidomethylene-3-phenylrhodanine and 0.85 g. (1 mol.+100% excess) of 3-methyl-1-phenyl-5-pyrazolone were placed in 10 cc. of pyridine containing 1.0 g. (1 mol.+300% excess) of triethylamine. The mixture was heated at the refluxing temperature for about two hours. The mixture was then cooled and diluted with a large volume of diethyl ether to precipiate the dye-salt. The dye-salt was filtered off, washed with a little ether and then twice recrystallized from methyl alcohol, after which it melted at 181° to 184° C. with decomposition.

EXAMPLE 8.—[3-*methyl*-1-*phenyl*-5-*pyrazolone*-(4)]-[*rhodanine*-(5)]-*methinoxonol*

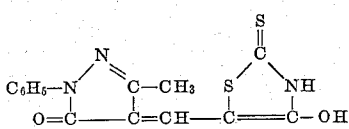

3.2 g. (1 mol.) of 4-acetanilidomethylene-3-methyl-1-phenyl-5-pyrazolone and 1.3 g. (1 mol.) of rhodanine were placed in 20 cc. of pyridine containing 3 g. (1 mol.+200% excess) of triethylamine. The mixture was heated at the refluxing temperature for about two hours. The reaction mixture was cooled and treated with a large volume of diethyl ether, whereupon an oil separated. The ether was decanted and the oily residue was treated with 10 cc. of concentrated hydrochloric acid (sp. g. 1.18). The free oxonol dye separated as a solid. The hydrochloric acid mixture was diluted with an equal volume of water and the free oxonol dye was filtered off. It was twice recrystallized from methyl alcohol.

EXAMPLE 9.—[*Barbituric acid*-(5)]-[3-*methyl*-1-*phenyl*-5-*pyrazolone*-(4)]-*methinoxonol*

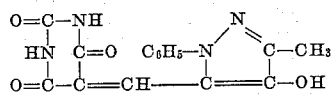

3.2 g. (1 mol.) of 4-acetanilidomethylene-3-methyl-1-phenyl-5-pyrazolone and 1.3 g. (1 mol.) of barbituric acid were placed in 20 cc. of pyridine containing 3 g. (1 mol.+200% excess) of triethylamine. The mixture was heated at the refluxing temperature for about three hours. The reaction mixture was cooled and diluted with 300 cc. of ether to precipitate the dye-salt. The ether was decanted and the dye-salt was treated with 10 cc. of concentrated hydrochloric acid, whereupon the free dye formed. The hydrochloric acid mixture was diluted with an equal volume of water and the free dye was filtered off. It was twice recrystallized from methyl alcohol. It was obtained as orange crystals melting at 288° to 290° C. with decomposition.

EXAMPLE 10.—[3-*methyl*-1-*phenyl*-5-*pyrazolone*-(4)]-[*thiobarbituric acid*-(5)]-*methinoxonol*

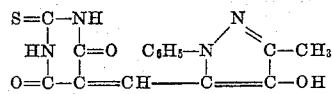

3.2 g. (1 mol.) of 4-acetanilidomethylene-3-methyl-1-phenyl-5-pyrazolone and 1.4 g. (1 mol.) of 2-thiobarbituric acid were placed in 20 cc. of pyridine containing 3 g. (1 mol.+200% excess) of triethylamine. The resulting mixture was heated at the refluxing temperature for about three hours. The reaction mixture was then cooled and diluted with 300 cc. of diethyl ether to precipitate the dye-salt. A tarry mass separated. The ether was decanted and the tarry mass was treated with 30 cc. of dilute hydrochloric acid (1 volume of concentrated hydrochloric acid diluted with 3 volumes of water), whereupon the free dye separated. It was filtered off and twice recrystallized from methyl alcohol. It was obtained as minute reddish crystals melting at 276° to 278° C. with decomposition.

EXAMPLE 11.—[*Benzoylacetonitrile*]-[3-*phenylrhodanine*-(5)]-*methinoxonol, triethylamine salt*

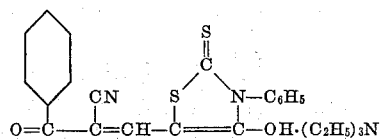

0.9 g. (1 mol.) of 5-acetanilidomethylene-3-phenyl-rhodanine and 0.7 g. (1 mol. +100% excess) of benzoylacetonitrile were placed in 10 cc. of pyridine containing 1 g. (1 mol.+300% excess) of triethylamine. The resulting mixture was heated at the refluxing temperature for about two hours. The cooled reaction mixture was diluted with 300 cc. of diethyl ether to precipitate the dye-salt. The dye-salt was filtered off, washed with a little ether and twice recrystallized from methyl alcohol. It was obtained as orange crystals, melting at 188° to 190° C. with decomposition. The free dye can be obtained by suspending the dye-salt in glacial acetic acid and treating the suspension with perchloric acid.

EXAMPLE 12.—[*Cyanacetanilide*]-[3-*phenylrhodanine*-(5)]-*methinoxonol, triethylamine salt*

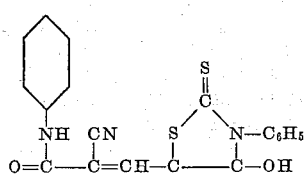

0.9 g. (1 mol.) of 5-acetanilidomethylene-3-phenylrhodanine and 0.8 g. (1 mol.+100% excess) of cyanacetanilide were placed in 10 cc. of pyridine containing 1 g. (1 mol.+100% excess) of triethylamine. The resulting mixture was heated at the refluxing temperature for about one hour. The reaction mixture was cooled and diluted with about 300 cc. of diethyl ether to precipitate the dye-salt. The dye salt was filtered off, washed with a little ether and twice recrystallized from methyl alcohol. It was obtained as reddish crystals melting at 235° to 237° C. with decomposition.

EXAMPLE 13.—[3-*ethyl-2-thio-2,4(3,5)-oxazoledione-(5)*]-[*-3-phenylrhodanine-(5)*]-*methinoxonol, triethylamine salt*

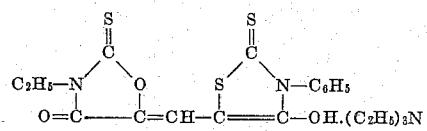

0.9 g. (1 mol.) of 5-acetanilidomethylene-3-phenylrhodanine and 0.7 g. (1 mol.+100% excess) of 3-ethyl-2-thio-2,4(3,5)-oxazoledione were placed in 10 cc. of pyridine containing 1 g. (1 mol.+300% excess) of triethylamine. The resulting mixture was heated at the refluxing temperature for about two hours. The dye-salt was precipitated by diluting the cooled reaction mixture with diethyl ether. It was twice recrystallized from methyl alcohol.

As demonstrated in the above examples, our new process gives rise to dyes of the following general formula:

III. 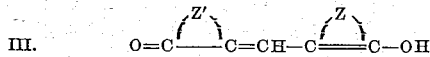

wherein Z and Z' each represent the non-metallic atoms necessary to complete an organic cyclic nucleus, e. g., a five-membered or six-membered organic heterocyclic nucleus, another mode of representation of this same group of dyes being:

IIIa. 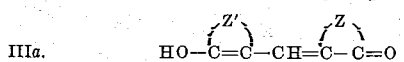

The dyes can be represented by either formula, as they are tautomeric substances. The dye-salts are invariably more deeply colored than the free oxonols. The dye-salts are ionized substances and may be represented as follows:

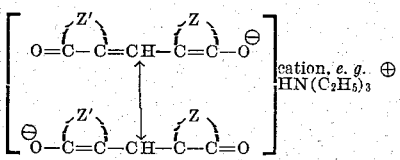

i. e. it is supposed that in the ionized state the dye is a strongly resonating substance.

The dyes of the above general formulas (III and IIIa), when Z and Z' each represent a five-membered organic heterocyclic nucleus containing a nuclear nitrogen atom and a nuclear thiocarbonyl group (particularly a rhodanine, a 2-thiohydantoin or a 2-thio-2,4(3,5)-oxazoledione nucleus), sensitive photographic emulsions strongly (see below). The free dyes are sometimes much stronger sensitizers of photographic emulsions than the dye-salts (see below).

Likewise, as demonstrated in the above examples, our new process gives rise to dyes of the following general formula:

IV. 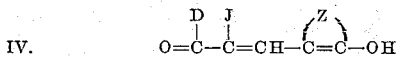

wherein D and J each represent separate organic groups and Z represents the non-metallic atoms necessary to complete an organic cyclic nucleus, e. g. a five-membered or six-membered organic heterocyclic nucleus. As in the case of dyes represented by Formula III, these dyes are tautomeric substances and can exist in two forms. The salts of these dyes are likewise more deeply colored than the free dyes. The salts of the dyes of the above general Formula IV, when D represents an aryl (e. g. of the benzene or naphthalene series) or an arylamino (e. g. phenylamino or naphthylamino), J represents a cyano (CN) group and Z represents a five-membered organic heterocyclic nucleus containing a nuclear nitrogen atom and a nuclear thiocarbonyl group (particularly a rhodanine, a 2-thiohydantoin or a 2-thio-2,4(3,5)-oxazoledione nucleus), sensitize photographic emulsions strongly.

We have also found that organic compounds of Formula II above can be condensed with acylated aminoacetic acids, in the presence of a water-binding agent, to give dyes of the above Formulas III and IV which contain an oxazolone nucleus. Suitable acylated aminoacetic acids are acetylaminoacetic acid, propionylaminoacetic acid and benzoylaminoacetic acid (hippuric acid) for example. Suitable water-binding agents are, for example, lower fatty acid anhydrides, such as acetic and propionic anhydrides. The following example illustrates the process.

EXAMPLE 14.—[*3-methyl-1-phenyl-5-pyrazolone-(4)*]-[*2-phenyl-5-oxazolone - (4)*] - *methinoxonol.*

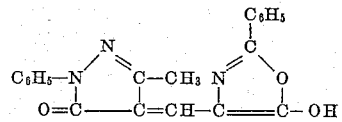

3.2 g. (1 mol.) of 4-acetanilidomethylene-3-methyl-1-phenyl-5-pyrazolone and 1.8 g. (1 mol.) of hippuric acid were placed in 20 cc. of acetic anhydride. The resulting mixture was heated at the refluxing temperature for about 15 minutes. The reaction mixture was chilled to about 0° C. whereupon the dye separated out as a solid. The dye was filtered off and twice recrystallized from methyl alcohol. It was obtained as orange yellow needles melting at 179° to 181° C. with decomposition.

The compounds of the above Formula II which we employ in our new process can be prepared, for example, as described in British Patent 479,-970 (complete accepted February 15, 1938).

Those of our new dyes containing a nuclear thiocarbonyl group (see under Formulas III and IV above) are particularly useful in the preparation of spectrally sensitized photographic silver halide emulsions. Photographic gelatino-silver-chloride emulsions especially are strongly sensitized by such dyes and some of their salts, although some of such new dyes and their salts likewise strongly sensitize gelatino-silver-bromide emulsions.

In the preparation of photographic emulsions containing such new dyes, it is only necessary to disperse the dyes in the emulsions. It is convenient to add the dyes to the emulsions in the form of solutions in appropriate solvents. The solvent must, of course, be compatible with the emulsion, substantially free from any deleterious effect on the light-sensitive materials in the emulsions and capable of dissolving the dyes. Methanol is a satisfactory solvent for our new dyes. Acetone can be employed. The dyes are advantageously incorporated in the finished washed emulsions and should be uniformly distributed throughout the emulsions.

The concentration of our new dyes in the emulsions can vary widely, e. g., from about 2 to 100 mg. per liter of ordinary flowable gelatino-silver-halide emulsion. The concentration of dye will vary according to the type of light-sensitive materials employed in the emulsion and according to the effects desired. The suitable and most economical concentration for any given emulsion will be apparent to those skilled in the art, upon making the ordinary tests and observations customarily employed in the art of emulsion-making. To prepare a gelatino-silver-halide emulsion, the following procedure is satisfactory: A quantity of the dye is dissolved in methyl alcohol or acetone and a volume of this solution (which may be diluted with water) containing from 2 to 100 mg. of dye is slowly added to 1000 cc. of a flowable gelatino-silver-halide emulsion with stirring. Stirring is continued until the dye is thoroughly incorporated in the emulsion. Ordinarily from 10 to 20 mg. of our new dyes per liter of emulsion suffice to produce the maximum sensitizing effect.

The following table is by way of illustration and shows the sensitizing action of a representative group of our new dyes.

Table

| Dye or dye-salt | Emulsion | Extra sensitivity | | |
|---|---|---|---|---|
| | | Extends to— | Maximum | Intensity |
| | | Mµ | Mµ | |
| Bis[3-ethylrhodanine-(5)]methinoxonol | Gelatino-silver-chloride | 620 | 519 | Strong. |
| [3-ethylrhodanine-(5)]-[3-phenylrhodanine-(5)]-methinoxonol | ___do___ | 620 | 572 | Very strong. |
| [3-methyl-1-phenyl-5-pyrazolone-(4)]-[rhodanine-(5)]-methinoxonol | Gelatino-silver-bromide | 532 | *500 | Weak. |
| [3-methyl-1-phenyl-5-pyrazolone-(4)]-[2-phenyl-5-oxazolone-(4)]-methinoxonol | Gelatino-silver-chloride | | | None. |
| [Barituric acid-(5)]-[3-methyl-1-phenyl-5-pyrazolone-(4)]-methinoxonol | ___do___ | | | Do. |
| [Thiobarbituric acid-(5)]-[3-methyl-1-phenyl-5-pyrazolone-(4)]-methinoxonol | ___do___ | | | Do. |
| Bis[3-ethylrhodanine-(5)]-methinoxonol, triethylamine salt | Gelatino-silver-bromide | 638 | 595 | Weak. |
| [3-ethylrhodanine-(5)]-[3-phenylrhodanine-(5)]-methinoxonol, triethylamine salt | Gelatino-silver-chloride | 618 | 590 | Do. |
| [3-ethyl-1-phenyl-2-thiohydantoin-(5)]-[3-phenylrhodanine-(5)]-methinoxonol, N-methylpiperidine salt | ___do___ | 626 | 570 | Very strong. |
| [3-methyl-1-phenyl-5-pyrazolone-(4)]-[3-phenylrhodanine-(5)]-methinoxonol, triethylamine salt | ___do___ | 552 | 518 | Weak. |
| [Benzoylacetonitrile]-[3-phenylrhodanine-(5)]-methinoxonol, triethylamine salt | ___do___ | 562 | 512 | Strong. |
| [Cyanacetanilide]-[3-phenylrhodanine-(5)]-methinoxonol, triethylamine salt | ___do___ | 565 | 514 | Do. |
| [Rhodanine-(5)]-[3-phenylrhodanine-(5)]-methinoxonol, triethylamine salt | ___do___ | 630 | 600 | Weak. |
| [3-ethyl-2,4(3,5)-oxazol-idione-(5)]-[3-phenylrhodanine-(5)]-methinoxonol, triethylamine salt | Gelatino-silver-bromide | 618 | 530 | Strong. |

*Flat.

Since the dyes obtainable by our new process are characterized by the fact that they contain the auxochromic atoms, O= and —OH (or —O$^\ominus$), the generic name "oxonol" is proposed (i. e. oxo for O=, and ol for —OH, n being added for euphony). The individual dyes may then be named in a simple fashion, the two nuclei being indicated, and "methinoxonol" being added to indicate that these oxonols contain a bridge (between the two nuclei) consisting of a single methine group. This form of nomenclature closely follows that used for dyes of the cyanine series in Beilstein's Handbuch (4th edition).

What we claim as our invention and desire to be secured by Letters Patent of the United States is:

1. A dye selected from the group consisting of dyes characterized by the following formula:

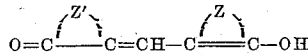

wherein Z and Z' each represent the non-metallic atoms necessary to complete a five-membered organic heterocyclic nucleus containing a nuclear nitrogen atom and a nuclear thiocarbonyl group, and the salts of said dyes.

2. A dye selected from the group of dyes characterized by the following formula:

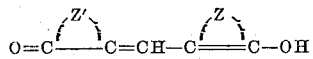

wherein Z and Z' each represent the non-metallic atoms necessary to complete an organic heterocyclic nucleus selected from the group consisting of rhodanine, 2-thiohydantoin and 2-thio-2,4(3,5)-oxazoledione nuclei.

3. A dye selected from the group of dyes characterized by the following formula:

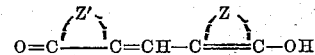

wherein Z and Z' each represent the non-metallic atoms necessary to complete a rhodanine nucleus.

4. A N-alkylpiperidine salt of a dye selected from the group of dyes characterized by the following formula:

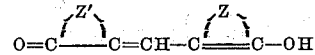

wherein Z represents the non-metallic atoms necessary to complete a rhodanine nucleus and Z' represents the non-metallic atoms necessary to complete a 2-thiohydantoin nucleus.

5. A trialkylamine salt of a dye selected from the group of dyes characterized by the following formula:

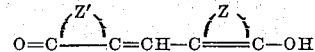

wherein Z represents the non-metallic atoms necessary to complete a rhodanine nucleus and Z' represents the non-metallic atoms necessary to complete a 2-thio-2,4(3,5)-oxazoledione nucleus.

6. [3-ethylrhodanine-(5)]-[3-phenylrhodanine-(5)]-methinoxonol.

7. [3-ethyl-1-phenyl-2-thiohydantoin-(5)]-[3-phenylrhodanine-(5)]-methinoxonol, N-methylpiperdine salt.

8. [3-ethyl-2-thio-2,4(3,5)-oxazoledione-(5)]-[3-phenylrhodanine-(5)]-methinoxonol, triethylamine salt.

9. A process for preparing a dye comprising condensing in the presence of a basic condensing agent, from about two to about three molecular proportions of an organic compound containing a -CH$_2$-CO- group with about one molecular proportion of an organic compound of the following general formula:

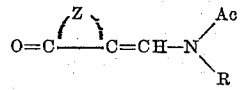

wherein Ac represents an acyl group, R represents an aryl group selected from the group consisting of aryl groups of the benzene and naphthalene series and Z represents the non-metallic atoms necessary to complete a heterocyclic organic nucleus selected from the group consisting of five-membered and six-membered heterocyclic organic nuclei.

10. A process for preparing a dye comprising condensing, in the presence of from about two to about four molecular proportions of a basic condensing agent, from about two to about three molecular proportions of an organic compound containing a -CH₂-CO- group with about one molecular proportion of an organic compound of the following general formula:

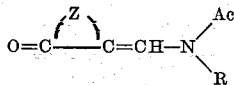

wherein Ac represents an acyl group, R represents an aryl group selected from the group consisting of aryl groups of the benzene and naphthalene series and Z represents the non-metallic atoms necessary to complete a heterocyclic organic nucleus selected from the group consisting of five-membered and six-membered heterocyclic organic nuclei.

11. A process for preparing a dye comprising condensing, in the presence of a tertiary organic base having a dissociation constant substantially greater than that of pyridine, an organic compound containing a —CH₂—CO— group with an organic compound of the following general formula:

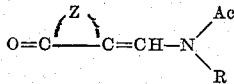

wherein Ac represents an acyl group, R represents an aryl group selected from the group consisting of aryl groups of the benzene and naphthalene series and Z represents the non-metallic atoms necessary to complete a heterocyclic organic nucleus selected from the group consisting of five-membered and six-membered heterocyclic organic nuclei.

12. A process for preparing a dye comprising condensing, in the presence of a basic condensing agent, a heterocyclic organic compound of the following general formula:

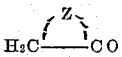

wherein Z represents the non-metallic atoms necessary to complete a five-membered heterocyclic organic nucleus containing a nuclear nitrogen atom and a nuclear thiocarbonyl group, with an organic compound of the following general formula:

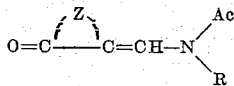

wherein Ac represents an acyl group, R represents an aryl group selected from the group consisting of aryl groups of the benzene and naphthalene series and Z represents the non-metallic atoms necessary to complete a five-membered heterocyclic organic nucleus containing a nuclear nitrogen atom and a nuclear thiocarbonyl group.

13. A process for preparing a dye comprising condensing, in the presence of a tertiary organic base having a dissociation constant substantially greater than that of pyridine, a heterocyclic organic compound of the following general formula:

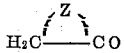

wherein Z represents the non-metallic atoms necessary to complete a five-membered heterocyclic organic nucleus containing a nuclear nitrogen atom and a nuclear carbonyl group, with an organic compound of the following general formula:

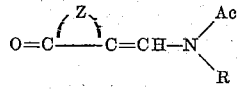

wherein Ac represents an acyl group, R represents an aryl group selected from the group consisting of aryl groups of the benzene and naphthalene series and Z represents the non-metallic atoms necessary to complete a five-membered heterocyclic organic nucleus containing a nuclear nitrogen atom and a nuclear thiocarbonyl group.

14. A process for preparing a dye comprising condensing, in the presence of from about two to about four molecular proportions of a tertiary organic base having a dissociation constant substantially greater than that of pyridine, from about two to about three molecular proportions of a heterocyclic organic compound of the following general formula:

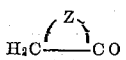

wherein Z represents the non-metallic atoms necessary to complete a five-membered heterocyclic organic nucleus containing a nuclear nitrogen atom and a nuclear thiocarbonyl group, with about one molecular proportion of an organic compound of the following general formula:

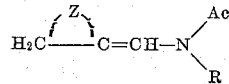

wherein Ac represents an acyl group, R represents an aryl group selected from the group consisting of aryl groups of the benzene and naphthalene series and Z represents the non-metallic atoms necessary to complete a five-membered heterocyclic organic nucleus containing a nuclear nitrogen atom and a nuclear thiocarbonyl group.

15. A process for preparing a dye comprising condensing, in the presence of from about two to about four molecular proportions of triethylamine, a rhodanine with a 5-acetanilidomethylenerhodanine.

16. A process for preparing a dye comprising condensing, in the presence of from about two to about four molecular proportions of N-methylpiperidine, a 2-thiohydantoin with a 5-acetanilidomethylenerhodanine.

17. A process for preparing a dye comprising condensing, in the presence of from about two to about four molecular proportions of triethylamine, a 2-thio-2,4(3,5)-oxazoledione with a 5-acetanilidomethylenerhodanine.

LESLIE G. S. BROOKER.
GRAFTON H. KEYES.